United States Patent
Dachs et al.

(10) Patent No.: US 9,545,746 B2
(45) Date of Patent: Jan. 17, 2017

(54) APPARATUS FOR THE AFTER-COOLING OF BASES

(71) Applicant: KRONES AG, Neutrabling (DE)

(72) Inventors: Alexander Dachs, Regensburg (DE);
Andreas Steiner, Wenzenbach (DE);
Erik Blochmann, Neutraubling (DE);
Ulrich Lappe, Neutraubling (DE)

(73) Assignee: KRONES AG (DE)

( * ) Notice: Subject to any disclaimer, the term of this patent is extended or adjusted under 35 U.S.C. 154(b) by 262 days.

(21) Appl. No.: 14/472,960

(22) Filed: Aug. 29, 2014

(65) Prior Publication Data

US 2015/0069669 A1     Mar. 12, 2015

(30) Foreign Application Priority Data

Sep. 10, 2013 (DE) ......................... 10 2013 109 907

(51) Int. Cl.
  *B29C 49/64* (2006.01)
  *B29C 35/16* (2006.01)
  *B29L 31/00* (2006.01)

(52) U.S. Cl.
  CPC .............. *B29C 49/64* (2013.01); *B29C 35/16* (2013.01); *B29C 2035/1616* (2013.01); *B29C 2035/1658* (2013.01); *B29C 2035/1691* (2013.01); *B29L 2031/712* (2013.01)

(58) Field of Classification Search
  CPC ............ B29C 2049/6692; B29C 49/64; B29C 2049/6669; B29C 49/66; B29C 2035/1691; B29C 2035/1616; B29C 2035/1658; B29C 2049/6661
  See application file for complete search history.

(56) References Cited

U.S. PATENT DOCUMENTS

| 3,666,849 A | 5/1972 | Williams et al. ............... 264/40 |
| 5,232,715 A * | 8/1993 | Fukai ..................... B29C 35/16 425/526 |
| 5,585,125 A * | 12/1996 | Iizuka ................ B29C 49/6481 264/520 |

(Continued)

FOREIGN PATENT DOCUMENTS

| CN | 102131629 | 7/2011 | ............. B29C 49/64 |
| CN | 102164727 | 8/2011 | ............. B29C 35/16 |

(Continued)

OTHER PUBLICATIONS

Partial machine translation of EP0304885A2 dated Mar. 1989 obtained from the espace website.*

(Continued)

*Primary Examiner* — Robert B Davis
(74) *Attorney, Agent, or Firm* — Hayes Soloway P.C.

(57) ABSTRACT

A method of after-cooling of the bases of blown out containers, wherein after the transfer of the blown out containers from a blow molding machine to a run-out star wheel which directly follows the blow molding machine along a conveying direction of the containers a cooling of the bases of the containers is carried out by at least one apparatus for cooling the bases. The cooling of the bases of the containers starts immediately during a time interval of at least 0.1 seconds and at most 2 seconds after a pressure release of the containers by the blow molding machine after the blowing out.

24 Claims, 2 Drawing Sheets

(56) References Cited

U.S. PATENT DOCUMENTS

| | | | |
|---|---|---|---|
| 5,851,478 A | 12/1998 | Iizuka et al. | 264/520 |
| 2004/0134202 A1* | 7/2004 | Omura | B29C 35/16 |
| | | | 62/64 |
| 2007/0235906 A1 | 10/2007 | Trouillet | 264/528 |
| 2011/0154785 A1* | 6/2011 | Stolte | B29C 49/64 |
| | | | 53/452 |
| 2011/0162940 A1 | 7/2011 | Derrien et al. | 198/339.1 |
| 2011/0169188 A1* | 7/2011 | Derrien | B29C 35/16 |
| | | | 264/237 |
| 2012/0085071 A1 | 4/2012 | Hahn et al. | 53/411 |

FOREIGN PATENT DOCUMENTS

| | | | | |
|---|---|---|---|---|
| DE | EP 0304885 A2 * | 3/1989 | | B29C 49/6481 |
| DE | 693 21 334 | 4/1999 | | B29C 49/08 |
| DE | 19909644 | 9/2000 | | B06C 49/06 |
| DE | 20 2008 005 257 | 12/2008 | | B29C 49/64 |
| DE | 10 2008 026 043 | 12/2009 | | B29C 49/66 |
| DE | 102008032123 | 1/2010 | | B29C 49/42 |
| EP | 0606496 | 7/1994 | | B29C 49/08 |
| EP | 2439048 | 4/2012 | | B29C 49/78 |
| GB | 1286289 | 8/1972 | | B29C 17/02 |
| WO | WO 2006/003304 | 1/2006 | | B29C 49/66 |
| WO | WO2011145913 | 11/2011 | | B29C 35/16 |

OTHER PUBLICATIONS

Partial machine translation of DE102008032123A1 dated Jan. 2010 obtained from the espace website.*
European Office Action (no translation) issued in application No. 14 184 276.5, dated Feb. 23, 2016 (8 pgs).
Chinese Office Action (w/translation) issued in application No. 201410410399.0, dated Mar. 28, 2016 (9 pgs).
German Search Report issued in corresponding German Patent Appln. No. 10 2013 109 907.6 dated Jun. 3, 2014 (8 pgs).

* cited by examiner

APPARATUS FOR THE AFTER-COOLING OF BASES

BACKGROUND OF THE INVENTION

The present invention relates to a method of after-cooling of the bases of blown out containers as well as to an apparatus for the after-cooling of the bases of blown out containers.

The method of after-cooling of the bases of blown out containers—described here—is based inter alia upon the fact that, after the transfer of the blow moulded containers from a blow moulding machine to a run-out star wheel which follows directly along a conveying direction of the containers to the blow moulding machine, a cooling of the bases of the containers is carried out by means of at least one apparatus for cooling the bases.

In this case the present invention is based inter alia upon the knowledge that in the stretch blow moulding of plastics material containers a residence time in the blow mould can be decisive for cooling the material on a wall of the mould in order to be able to remove dimensionally stable containers from the blow mould. In the course of increasingly higher ejection performances, however, the residence time becomes increasingly shorter. An outer edge layer just in the base region, in which thicker weakly stretched or non-stretched material is always situated, can frequently be cooled only with difficulty. This is due to the fact, inter alia, that a temperature moves outwards from an inner side in the base region, and a (dimensionally stable) outer layer—already present after the blow moulding in a cooling process and therefore already cooled—starts to heat up again and in an insidious manner from the inside for example and/or starts to become deformed in an undesired manner.

In order to prevent an after-heating and/or a subsequent deformation in this way, it has been proposed to set up an after-cooling of the base, in which a base region of a blown out container is cooled once again after leaving the blow moulding machine. In present-day station performances the cooling time in the blow mould can in fact be so low that the impermissible deformation of a base region of the blown out container starts before the start of the after-cooling of the base downstream of the blow moulding machine. In this respect, an undesired subsequent deformation after the blowing out of the base region of the blown out containers can be prevented only with difficulty even with present-day base cooling apparatus.

In this respect, it is an aim inter alia of the present invention to indicate possibilities for letting the cooling of the bases of the containers start before undesired subsequent deformation in this way starts. Such a problem of the undesired subsequent deformation, however, has hitherto been solved only in an inadequate manner in the prior art. Only methods have been proposed in the prior art therefore which inter alia are directed towards more temperature already being dissipated in the blow moulding machine in the region of the blow moulding wheel by way of the base of the blown out containers or having ready blow moulding air in the blow moulding wheel flow from container to container in a manner similar to air recycling, but this has the result of an increased consumption of air.

In this respect, it is an object of the present invention to prevent the problems of an undesired subsequent deformation of the bases as specified above and thus to indicate a method of after-cooling the bases of blown out containers which on the one hand is inexpensive and at the same time allows high clock-time speeds in this case and at the same time subsequent deformation of the bases of blown out containers is prevented.

SUMMARY OF THE INVENTION

Now, in order to make available a method of after-cooling of the bases of blown out containers which is both inexpensive and allows high ejection times and in which undesired subsequent deformation of the bases after blow moulding is likewise prevented in this case, the present invention makes use of the idea, inter alia, that the cooling of the bases of the containers starts immediately during a time interval of at least 0.1 seconds and at most 2 seconds after a pressure release of the containers by the blow moulding machine.

In this respect, the time interval of the after-cooling of the bases starts inside the blow moulding machine, i.e. immediately after the moment of release, so that the time interval begins even during the transfer from the blow moulding machine into the run-out star wheel which directly follows the blow moulding machine in the conveying direction.

The discovery has in fact surprisingly been made that the undesired subsequent deformation of the bases after the blowing out of plastics material pre-forms into blown out containers can be stopped and prevented in a particularly effective and efficient manner in a narrow time interval of this type starting from the release of the blown out containers, without ejection rates of the container production process as a whole starting from the preparation of plastics material pre-forms to the ready filled container being reduced. In particular, in this case the application and start of the cooling procedure of the base region of the container blown out in each case is decisive. This can mean in particular that although the cooling of the bases of the containers—as described here—by means of the apparatus for cooling the bases starts within the time interval of at least two seconds and at most 10 seconds, in accordance with the production requirements it also lasts beyond this time interval in a manner capable of being pre-set.

Alternatively, it is possible for the entire cooling of the bases—as described here—by the apparatus for cooling the bases both to start within the time interval and to terminate with the time interval claimed.

In this respect, a particularly efficient and advantageous method of after-cooling the bases of blown out containers is now provided. In addition, the base region of the respective blown out containers can be cooled still more efficiently by means of a further apparatus for cooling the bases—which follows the apparatus for cooling the bases—as described here—or the run-out star wheel—as described here—in the conveying direction of the blown out containers. In accordance with at least one embodiment of the method of after-cooling the bases of blown out containers, after the transfer of the blown out containers from a blow moulding machine to a run-out star wheel which directly follows the blow moulding machine along a conveying direction of the containers, an after-cooling of the bases of the containers is carried out by means of at least one apparatus for cooling the bases. In this case the cooling of the bases of the container starts immediately during a time interval of at least 0.1 seconds and at most 2 seconds after a pressure release of the containers by the blow moulding machine after the blowing out.

In accordance with at least one embodiment the apparatus for cooling the bases comprises at least one external face cooler which applies a cooling medium to an external face of the bases of the blown out containers. It has in fact been found that an external face cooler of this type is capable of being applied in a particularly simple manner to the respective external faces of the bases of the blown out containers, without an external face cooler of this type having to be implemented in an expensive manner in the apparatus for cooling the bases. This is due inter alia to the fact that an external face of the bases of the blown out containers is accessible to the apparatus for cooling the bases in a particularly simple manner within the production process.

In accordance with at least one embodiment the apparatus for cooling the bases cools the bases of the containers by means of water or air as the cooling medium. In particular, the apparatus for cooling the bases can be designed in the form of a "Vortec" cooling means". This means, in particular, that as a result all the features with respect to a "Vortec" cooling means have to be considered as being disclosed. Water or air as the cooling medium provides the advantage in fact that the cooling medium is both inexpensive and available in a more or less unlimited form.

In accordance with at least one embodiment the external face cooler comprises at least one atomizing spray element which sprays the cooling medium onto the external face of the bases of the containers. To this end, the atomizing spray element can comprise at least one atomizing spray nozzle which sprays the cooling medium—which for example is water or another liquid—preferably in an extensive manner onto an external face of the container, and in particular onto an external face of the container in the region of the bases of the containers. An atomizing spray nozzle of this type has the advantage in fact that by means of a very low requirement for a cooling medium the aforesaid cooling medium is atomized by way of the atomizing spray nozzle into very fine droplets and these droplets therefore strike against the external face of the respective blown out container in the manner of a spray. Atomizing spray nozzles of this type are therefore suitable for a particularly efficient and inexpensive cooling on the one hand and, on account of their small dimensions, are capable of being mounted in a particularly simple manner in the region and/or on the run-out star wheel on the other hand.

In accordance with at least one embodiment the external face cooler comprises at least one sprinkler element which sprinkles the cooling medium onto the external face of the bases of the containers. A sprinkler element of this type is characterized in that droplets produced by the sprinkler element strike in the manner of rain against the external face of the blown out container, as a result of which it is made possible for a larger quantity of the cooling medium to be able to strike against the external face of the blown out container within a shorter period of time than is the case for example with spray nozzles, and can therefore cool the external face to a greater degree depending upon the arrangement of the sprinkler element.

In accordance with at least one embodiment the external face cooler comprises at least one sponge element which is saturated at least in part with the cooling medium and the external face of which is capable of being brought into contact with the external face of the base of the container. In particular, a sponge element of this type can absorb the cooling medium on a continuous basis, so that a cooling medium need not necessarily be constantly pressed on for application to the external face of the blown out container. In particular, it is possible for the sponge element to be permanently connected to fluid lines which convey the cooling medium from a reservoir to the sponge element, so that depending upon the degree of saturation of the sponge element and the absorption properties thereof the cooling medium is automatically absorbed by the sponge element.

In accordance with at least one embodiment the sponge element is designed in the form of a sponge roller. In this connection it is possible for a sponge element of this type to be mounted for example on or in the region of the run-out star in an immovable manner and—as the blown out container is moved past—for the aforesaid container to pass the sponge element designed in the form of a sponge roller and therefore to be moved past the latter. During the conveying past, it is preferable for the sponge element to be brought into direct contact with an external face of the blown out container, and in particular in the base region of the respective container, so that the cooling medium absorbed by the sponge element comes into direct contact with the external face of the container, and the external face can be effectively cooled by way of the direct contact with the sponge element while the containers are conveyed along in the conveying direction.

In accordance with at least one embodiment the apparatus for cooling the bases comprises at least one fan cooling means, in which case air, in particular air from the environment, is conveyed to the bases of the containers by means of the fan cooling means. With the fan cooling means it is therefore possible to dispense with a liquid cooling medium and, instead, for the cooling medium to be supplied in the form of air. In this respect it is possible to dispense with complicated fluid lines for the supply of the cooling medium to the external face of the blown out containers and the ambient air produced in a particularly simple and inexpensive manner by means of a preliminary pressure of one cooling flow can be blown for example onto the external face in the region of the bases of the containers.

It is also possible in this context for the fan cooling means—as described here—to be capable of being combined with one of the embodiment[s]—as described here—of the cooling apparatus of the base, in particular with the external face cooler as described here, so that the respective positive effects and advantages of the individual cooling apparatus can complement one another and can form a synergy effect.

In accordance with at least one embodiment the apparatus for cooling the bases comprises at least one liquid pre-metering means which during the time interval starts to meter at least one cooling medium into the blown out containers in a manner capable of being pre-set in an interior of the containers. In this context "metering in" means that the liquid pre-metering means fills a quantity of the cooling medium capable of being pre-set, for example in the form of an atomized spray and/or injected, into the interior of the containers. A liquid pre-metering means of this type therefore ensures that—in particular in the region of the bases of the containers—the individual container can be cooled from the inside towards the outside starting from an internal face of the container. It is possible for the apparatus for cooling the bases—as described here—comprising the liquid pre-metering means—as described here—to be additionally combined with at least one of the embodiments of the apparatus for cooling the bases—as described above—so that it is possible for the apparatus for cooling the bases—as described here—to comprise both the external face cooler—as described here—and the liquid pre-metering means—as described here—so that the two "types of cooling of the bases" can in turn be added together in an advantageous manner. This ensures that the base region, and in particular the bases of the containers, can be cooled in a uniform manner both starting from the external face of the containers on the outside and from the internal face on the inside in particularly short throughput times. In this respect, a temperature gradient and a temperature drop in the direction of the wall thickness can be as homogeneous and constant as possible. In this respect, side walls and the base of the container can be cooled in a particularly efficient manner both from the inside and from the outside.

In addition, an apparatus is disclosed for after-cooling the bases of blown out containers. By way of example, a method of after-cooling the bases of blown out containers, as described in conjunction with one or more of the embodiments—as specified above—can be carried out by means of the apparatus described here for after-cooling the bases of blown out containers.

In accordance with at least one embodiment, by means of the apparatus for after-cooling the bases of blown out containers after the transfer of the blown out containers from a blow moulding machine to a run-out star wheel which directly follows the blow moulding machine along a conveying direction of the containers, a cooling of the bases of the containers is capable of being carried out by means of at least one apparatus for cooling the bases. In this case the cooling of the bases of the containers is capable of being started immediately during a time interval of at least 0.1 seconds and at most 2 seconds after a pressure release of the containers by the blow moulding machine.

In this respect, the apparatus for the after-cooling of bases—as described here—comprises at least the apparatus for cooling the bases—as described here—which is provided and set up on or in the region of the run-out star wheel for cooling the blown out containers during the conveying in the run-out star wheel.

In this case the apparatus for the after-cooling of bases—as described here—and in particular the apparatus for cooling the bases—as described here—can have the embodiments and advantages already outlined in conjunction with the method.

The method—as described here—and the apparatus—as described here—for the after-cooling of bases of blown out containers explained in greater detail with reference to an embodiment and the accompanying figures.

BRIEF DESCRIPTION OF THE DRAWINGS

In the embodiment and the figures the same components or components acting in a similar manner are provided in each case with the same references. The elements illustrated are not to be regarded as being true to scale, but rather individual elements can be shown exaggerated in size for improved understanding.

BRIEF DESCRIPTION OF THE INVENTION

Figure 1:
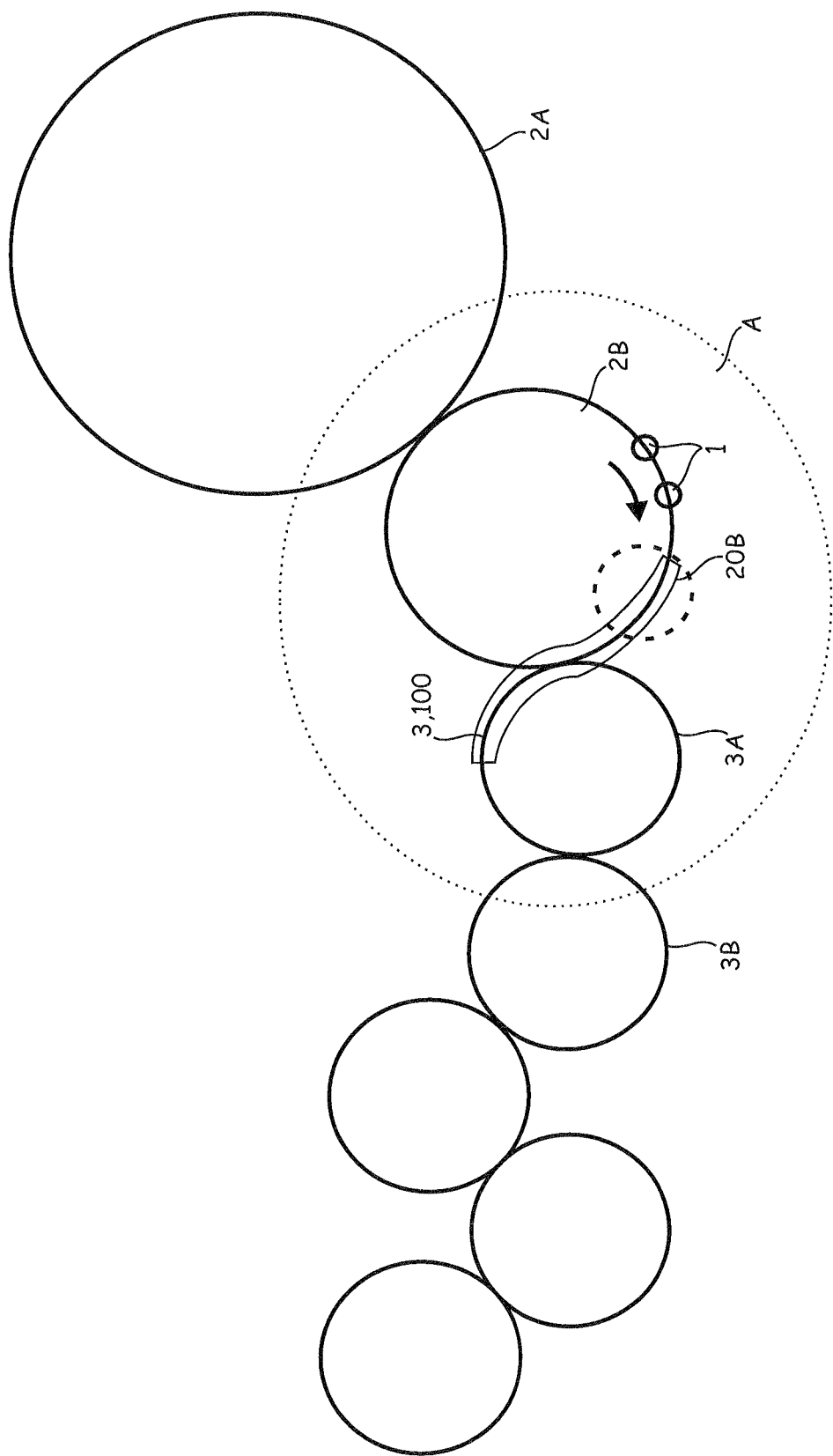
FIG. 1 is a diagrammatic plan view of an embodiment of a method and an apparatus for the after-cooling of bases of blown out containers.

A cut-away view of a container production plant is shown in FIG. 1 by way of a diagrammatic plan view. It will be noted in this case that the container production plant comprises a blow moulding machine 2A and a run-out star wheel 2B which directly follows the blow moulding machine 2A (in the direction of the arrow) in the conveying direction of containers 1. In addition, the container production plant—as described here—comprises at least one apparatus 3 for cooling the bases which is situated in the region (i.e. for example as far as below that of the run-out star wheel 2B) of the run-out star wheel 2B. A heating device (not shown), which heats the plastics material pre-forms for example by means of IR radiation, NIR radiation, microwave radiation, lasers etc., is provided upstream of the blow moulding machine 2A. Downstream of the heating device the heated pre-forms are set by means of a conveying star wheel in the division required in the blow moulding machine 2A and are placed in the blow moulding machine 2A. Inside the blow moulding machine 2A the plastics material pre-forms are shaped by at least two, and in particular three, pressure stages inside blow moulds to form plastics material containers. The blow moulding machine 2A has adjoining it a run-out star wheel 2B, which can convey the plastics material containers by way of further transfer elements—in particular the first conveying wheel 3A and the second conveying wheel 3B—to a follower machine. The follower machines may be in the form, in particular, of labelling apparatus or filling apparatus. If the follower machine is a labelling apparatus, it is possible for the latter to be arranged immediately downstream of the transfer element 3B. In particular in the ease of labelling apparatus arranged downstream (so-called "ErgoBlocs"™) it is necessary in fact for the containers to be wetted as little as possible on the external faces thereof with liquids, so that the labels applied receive the necessary fixing. In this case it is therefore advantageous for the containers to be cooled by means of air (so-called "Vortec" cooling) downstream of the blow moulding machine. If the follower machine is a filling apparatus, it would also be possible for the cooling of the containers to be carried out by means of water.

In particular, it is evident from FIG. 1 that the apparatus 3 for cooling the bases is situated in the region 20B of the run-out star wheel 2B shortly before the transfer to a conveying wheel 3A and starts to cool the containers 1 already blown out, in particular in a region of a base 11 of the containers 1. In this case it is essential to the invention that the cooling of the bases of the containers 11 should start during a time interval of at least 0.1 seconds and at most 2 seconds after a pressure release of the containers by the blow moulding machine 2A after the blowing out or release respectively. This ensures that undesired deformation of the material—caused for example by a non-homogeneous cooling pattern in the base region—does not occur in the base region 11 of the respective containers 1 after the direct release and blowing out. In other words "no time is allowed" for the base region of the containers 1 to be deformed in an undesired manner and, instead, the cooling of the base by the apparatus 3 for cooling the bases is begun by such a brief time interval as quickly as possible after the pressure release, in which case, however, the apparatus 3 for cooling the bases—and this should be mentioned explicitly—can also last beyond the time interval in a manner capable of being pre-set and—as is evident, in particular, from FIG. 1—also extends as far as the first conveying wheel 3A. It is also possible for the apparatus 3 for cooling the bases to extend into the region of a second conveying wheel 3B.

In addition, it should be mentioned that the apparatus 3 for cooling the bases—as described here—comprises a "Vortec" cooling means.

Figure 2:
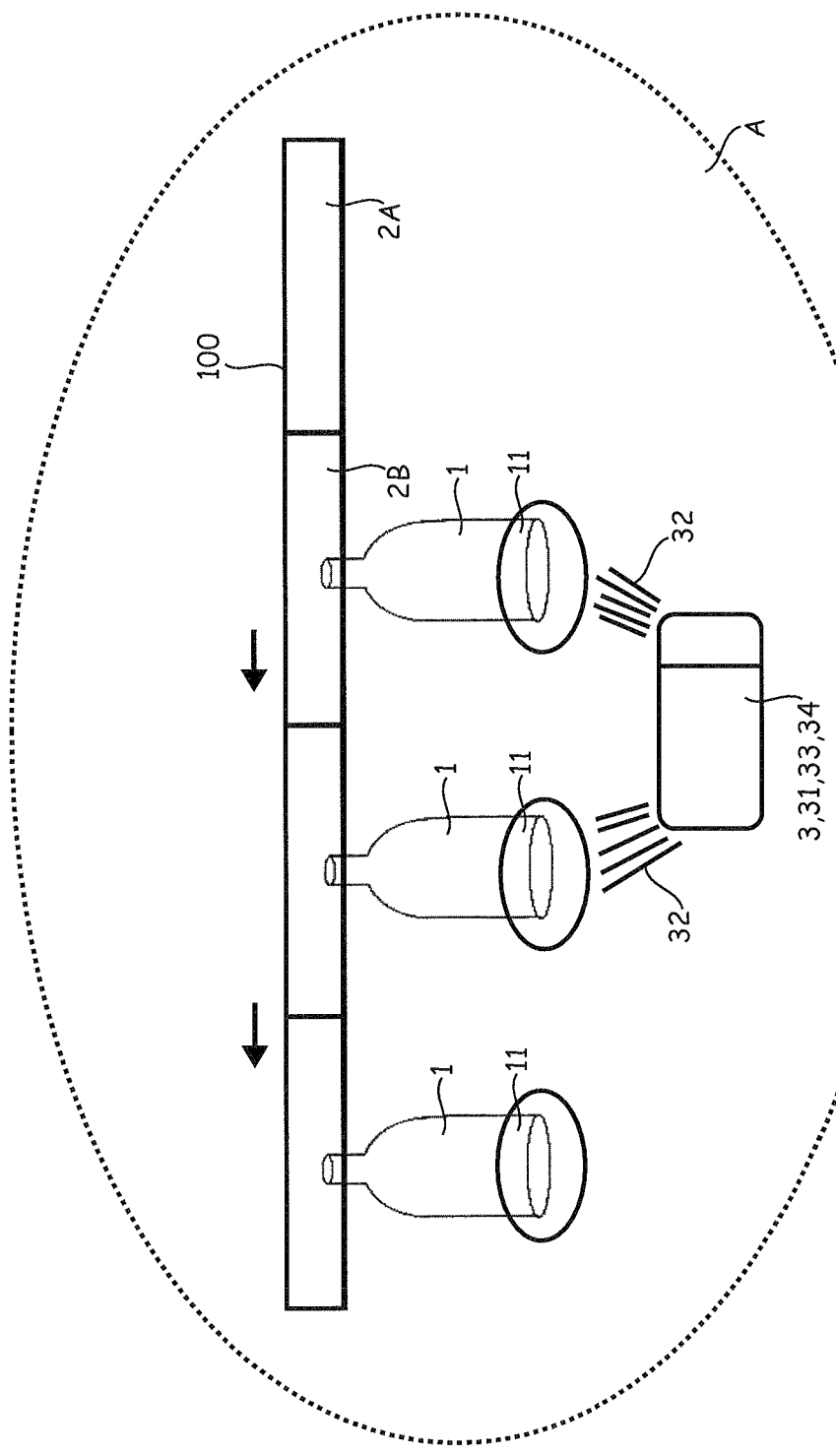
FIG. 2 is a diagrammatic plan view of an apparatus for the after-cooling of bases of blown out containers according to FIG. 1.

In particular, as mentioned in the introduction, the apparatus 3 for cooling the bases—as described here—can comprise an external face cooler 33, a fan cooling means 31 and a liquid pre-metering means 34—as described here—or even a sprinkler element—as described here—(see also FIG. 2). In this case the apparatus 3 for cooling the bases can also comprise a combination—capable of being pre-set—of the special embodiment—as described here—of the apparatus 3 for cooling the bases, so that it is made possible by way of the apparatus 3 for cooling the bases to be able to combine individual cooling elements, i.e. for example the external face cooler, together with the liquid pre-metering means 34—as described here—"in the manner of a construction kit". In other words, by means of the apparatus—a described here—for the after-cooling 100 of the bases as well as by the method—as described here—of after-cooling the bases of blown out containers 1, as is described in FIG. 1, an after-cooling of the bases is made possible in a particularly simple manner, in which undesired deformation of material, in particular in the base region 11 of the containers 1, can be prevented in a surprising manner by the specifically claimed time interval after a pressure release of the containers by the blow moulding machine, and at the same time high throughput rates are always provided.

The apparatus 3 for cooling the bases shown in FIG. 1 is shown (purely diagrammatically) in a cut-away section A in FIG. 2 with reference to a diagrammatic side view. It will be noted that the apparatus 3 for cooling the bases is arranged (in particular immediately) below the run-out star wheel 2B and is directed in its orientation to the respective base regions 11 of the containers 1. In other words a cooling medium 32 can strike against an external face of the respective containers 1 immediately within the claimed time interval in order to cool the latter in a particularly effective manner.

The invention is not restricted by the description with reference to the embodiments. The invention in fact covers any novel feature as well as the combination of features, and this includes in particular any combination of features in the claims, even if this feature or this combination itself is not explicitly set out in the claims or in the embodiments.

LIST OF REFERENCES 1 containers
2A blow moulding machine
2B run-out star wheel
3 apparatus for cooling the bases
3A first conveying wheel
3B second conveying wheel
11 base of a container
20B region
31 fan cooling means
32 cooling medium
33 external face cooler
34 liquid pre-metering means
100 apparatus for the after-cooling of the bases

The invention claimed is:

1. A method for reducing or preventing deformation of bases of blown out containers caused by non-homogenous cooling of the bases after the blown out containers are released from a blow moulding machine and transferred from the blow moulding machine to a run-out star wheel which directly follows the blow moulding machine along a conveying direction of the containers, comprising actively cooling the bases of the containers using an apparatus for cooling, commencing the cooling while the bases are still inside the blow moulding machine immediately following a time interval of at least 0.1 seconds and at most 2 seconds after a pressure release of the containers by the blow moulding machine, so that the time interval runs even during the transfer from the blow moulding machine into the run-out star wheel.

2. The method according to claim 1, wherein the apparatus for cooling the bases comprises at least one external face cooler which applies a cooling medium to an external face of bases of the blown out containers.

3. The method according to claim 2, wherein the apparatus for cooling the bases cools the bases of the containers using water or air as the cooling medium.

4. The method according to claim 2, wherein the external face cooler comprises at least one atomizing spray element which sprays the cooling medium onto the external face of the bases of the blown out containers.

5. The method according to claim 2, wherein the external face cooler comprises at least one sprinkler element which sprinkles the cooling medium onto the external face of the bases of the blown out containers.

6. The method according to claim 2, wherein the external face cooler comprises at least one sponge element which is saturated at least in part with the cooling medium and the external face of which is capable of being brought into contact with the external face of the base of the blown out container.

7. The method according to claim 6, wherein the sponge element is designed in the form of a sponge roller.

8. The method according to claim 1, wherein the apparatus for cooling the bases comprises at least one fan, wherein air is conveyed to the bases of the blown out containers by the fan.

9. The method according to claim 1, wherein the apparatus for cooling the bases comprises at least one liquid pre-metering device which during the time interval starts to meter in at least one cooling medium into the blown out containers in a manner capable of being pre-set into an interior of the containers.

10. A blow moulding apparatus including a heating device for heating pre-forms, and a blow moulding machine for blowing out the preforms, for practicing the method of claim 1, said apparatus comprising a run-out star wheel which follows the blow moulding machine immediately along a conveying direction of the containers from the blow moulding machine, and a cooling apparatus for actively cooling the bases of the containers, wherein the cooling apparatus is arranged so that a cooling of the bases of the containers commences while the bases are still in the blow moulding machine immediately during a time interval of at least 0.1 seconds and at most 2 seconds after a pressure release of the containers by the blow moulding machine, so that the time interval runs even during the transfer from the blow moulding machine into the run-out star wheel.

11. The method according to claim 3, wherein the external face cooler comprises at least one atomizing spray element which sprays the cooling medium onto the external face of the bases of the blown out containers.

12. The method according to claim 3, wherein the external face cooler comprises at least one sprinkler element which sprinkles the cooling medium onto the external face of the bases of the blown out containers.

13. The method according to claim 3, wherein the external face cooler comprises at least one sponge element which is saturated at least in part with the cooling medium and the external face of which is capable of being brought into contact with the external face of the base of the blown out container.

14. The method according to claim 13, wherein the sponge element is designed in the form of a sponge roller.

15. The method according to claim 2, wherein the apparatus for cooling the bases comprises at least one fan, wherein air is conveyed to the bases of the blown out containers by the fan.

16. The method according to claim 2, wherein the apparatus for cooling the bases comprises at least one liquid pre-metering device which during the time interval starts to meter in at least one cooling medium into the blown out containers in a manner capable of being pre-set into an interior of the blown out containers.

17. A method for reducing or preventing deformation of bases of blown out containers caused by non-homogenous cooling of the bases after the blown out containers are released from a blow mould of a blow-moulding machine and transferred from the blow moulding machine to a run-out star wheel which directly follows the blow moulding machine along a conveying direction of the containers, comprising actively cooling the bases of the containers using an apparatus for cooling, wherein the cooling of the bases of the containers is commenced during a time interval of at least 0.1 seconds and at most 2 seconds after a pressure release of the containers by the blow moulding machine, using at least one external face cooler which applies a cooling medium to an external face of bases of the blown out containers.

18. The apparatus according to claim 10, further comprising a plurality of cooling apparatus for cooling the bases or the run-out star wheel in the conveying direction of the blown out containers.

19. The apparatus according to claim 10, wherein the cooling apparatus for cooling the bases is located in a region of the run-out star wheel immediately upstream of the transfer to a first conveying wheel and starts to cool the blown out containers.

20. The apparatus according to claim 19, wherein the cooling apparatus for cooling the bases extends to the first conveying wheel.

21. The apparatus according to claim 19, wherein the cooling apparatus for cooling the bases extends to a region of a second conveying wheel.

22. The apparatus of claim 10, wherein the cooling apparatus employs air as cooling medium for cooling the container bottoms.

23. The apparatus according to claim 10, wherein the cooling apparatus employs water as a cooling medium for cooling the container bottoms.

24. The apparatus according to claim 10, further including a labeling unit of the cooling apparatus arranged downstream of the cooling apparatus.

* * * * *